(12) United States Patent
Darde

(10) Patent No.: US 9,797,653 B2
(45) Date of Patent: Oct. 24, 2017

(54) METHOD AND DEVICE FOR CONDENSING A CARBON DIOXIDE-RICH GAS STREAM

(71) Applicant: L'Air Liquide, Societe Anonyme Pour l'Etude et l'Exploitation des Procedes Georges Claude, Paris (FR)

(72) Inventor: Arthur Darde, Paris (CN)

(73) Assignee: L'Air Liquide Société Anonyme pour l'Étude et l'Exploitation des Procedes Georges Claude, Paris (FR)

( * ) Notice: Subject to any disclaimer, the term of this patent is extended or adjusted under 35 U.S.C. 154(b) by 172 days.

(21) Appl. No.: 14/384,227

(22) PCT Filed: Mar. 5, 2013

(86) PCT No.: PCT/FR2013/050468
§ 371 (c)(1),
(2) Date: Sep. 10, 2014

(87) PCT Pub. No.: WO2013/135996
PCT Pub. Date: Sep. 19, 2013

(65) Prior Publication Data
US 2015/0047389 A1  Feb. 19, 2015

(30) Foreign Application Priority Data
Mar. 13, 2012 (FR) ...................... 12 52262

(51) Int. Cl.
*F25J 1/00* (2006.01)
*F04D 29/58* (2006.01)
(Continued)

(52) U.S. Cl.
CPC .......... *F25J 1/0027* (2013.01); *B01D 53/002* (2013.01); *F04D 29/5833* (2013.01); *F25J 1/006* (2013.01);
(Continued)

(58) Field of Classification Search
CPC .... F25J 1/0297; F25J 2230/04; F04B 29/5833
See application file for complete search history.

(56) References Cited

U.S. PATENT DOCUMENTS 3,398,534 A    8/1968  Hucks, Jr.
7,269,956 B2 * 9/2007  Gericke .................... F01K 7/40
                                                   60/39.182
(Continued)

FOREIGN PATENT DOCUMENTS

BE  WO 2011088527 A3 *  1/2012  ............. F04B 39/06
DE  20 2008 013445       1/2009
(Continued)

OTHER PUBLICATIONS

Aspelund, A., et al., "Ship Transport of CO2 Technical Solutions and Analysis of costs, Energy Utilization, Exergy Efficiency and CO2 Emissions," Chemical Engineering Research and Design, Part A, Institution of Chemical Engineers, XX, vol. 84, No. A9, Sep. 1, 2006, pp. 847-855.

(Continued)

*Primary Examiner* — Tareq Alosh
(74) *Attorney, Agent, or Firm* — Justin K. Murray

(57) ABSTRACT

The invention relates to a method for condensing a carbon dioxide-rich gas stream, wherein a stream of water heated by an exchange of heat with the carbon dioxide-rich stream, which is at least partially condensed, is sent to at least one compressor (3,21) for compressing the carbon dioxide-rich stream or a fluid, the carbon dioxide-rich stream of which is derived, in order to at least partially cool at least one stage of said compressor.

4 Claims, 5 Drawing Sheets

(51) Int. Cl.
  B01D 53/00 (2006.01)
  F25J 3/02 (2006.01)
  F28B 1/02 (2006.01)
  F28C 1/00 (2006.01)
(52) U.S. Cl.
  CPC ....... *F25J 3/0266* (2013.01); *B01D 2257/504* (2013.01); *F25J 2200/02* (2013.01); *F25J 2200/70* (2013.01); *F25J 2205/04* (2013.01); *F25J 2205/34* (2013.01); *F25J 2210/04* (2013.01); *F25J 2215/04* (2013.01); *F25J 2220/82* (2013.01); *F25J 2230/04* (2013.01); *F25J 2230/30* (2013.01); *F25J 2230/32* (2013.01); *F25J 2230/80* (2013.01); *F25J 2240/90* (2013.01); *F25J 2245/02* (2013.01); *F25J 2270/12* (2013.01); *F25J 2270/80* (2013.01); *F28B 1/02* (2013.01); *F28C 2001/006* (2013.01); *Y02C 10/12* (2013.01)

(56) References Cited

U.S. PATENT DOCUMENTS

| | | | |
|---|---|---|---|
| 8,601,833 B2 * | 12/2013 | Dee | F25J 1/0015 62/615 |
| 2010/0275648 A1 * | 11/2010 | Mazumder | F01K 23/068 62/645 |
| 2011/0265477 A1 * | 11/2011 | Drouvot | F01K 17/02 60/653 |
| 2011/0296868 A1 | 12/2011 | Lockwood et al. | |
| 2013/0192228 A1 * | 8/2013 | Alekseev | F01K 25/00 60/645 |

FOREIGN PATENT DOCUMENTS

| | | |
|---|---|---|
| EP | 0 644 390 | 3/1995 |
| EP | 0 654 643 | 5/1995 |
| WO | WO 03/033428 | 4/2003 |

OTHER PUBLICATIONS

Written Opinion for PCT/FR2013/050468, mailed Mar. 5, 2013.
International Search Report for PCT/FR2013/050468, mailed Apr. 28, 2015.
Search report for AU 2013 234 169, mailed Apr. 4, 2017.

* cited by examiner

METHOD AND DEVICE FOR CONDENSING A CARBON DIOXIDE-RICH GAS STREAM

CROSS REFERENCE TO RELATED APPLICATIONS

This application is a §371 of International PCT Application PCT/FR2013/050468, filed Mar. 5, 2013, which claims the benefit of FR1252262, filed Mar. 13, 2012, both of which are herein incorporated by reference in their entireties.

TECHNICAL FIELD OF THE INVENTION

The present invention relates to a method and to an installation for condensing a gaseous stream rich in carbon dioxide. A stream rich in carbon dioxide contains at least 60% carbon dioxide, or even at least 90% carbon dioxide.

These percentages, like all the percentages regarding purities in this document, are molar percentages.

BACKGROUND

Cooling circuits using water, possibly with the addition of glycol, to cool a compressor of a stream rich in carbon dioxide are known from US-A-2011/0265477.

After a gas stream rich in carbon dioxide has been purified, it is often necessary to condense it so that it can be pumped to a pipeline.

In FIG. 1, a compressor 3 compresses a fluid 1 containing carbon dioxide at a pressure of 1 bar. The compressor is kept cold via a water circuit 5, 5A. The compressed fluid 7 is purified in a purification unit 9 and separated by separation means, in this instance a low-temperature distillation column 15. The fluid is cooled in the exchanger 13, condenses at least partially in a bottom reboiler 17 and is sent as feedstock to the column 15. The head gas 22 rich in light components is expanded in a turbine 24. The bottom liquid 19 vaporizes in the exchanger 13 to form a stream of gas rich in carbon dioxide which is compressed in a compressor 21. This compressor is cooled by a water circuit 23, 23A. The stream of gas at 60 bar is condensed by exchange of heat with a stream of water 31 to form the liquid 29 which is pumped in the pump 33 at a pressure greater than 110 bar to form the pressurized liquid product 35.

The book "Fabrication et Applications Industrielles de $CO_2$ [Production and industrial applications of $CO_2$]" by M. Vollenweider, published by Dunod, 1958, teaches how to use a water circuit in common for cooling the carbon dioxide that is to be condensed and for cooling the compressor of the carbon dioxide that is to be condensed. Now, FIG. 111-1 on page 30 shows two streams of water which are independent: the water used to condense the carbon dioxide is not used thereafter for cooling the compressor. The method in this Figure corresponds to the preamble of the first independent claim.

It is also often necessary to condense the gaseous stream rich in carbon dioxide so that it can be supercooled for use as a refrigeration cycle as illustrated in FIG. 2.

In this instance, a refrigeration cycle uses as its cycle gas a stream rich in carbon dioxide. This closed circuit comprises a condenser 27 cooled by a stream of water. The gas rich in carbon dioxide liquefies therein to form the stream 29, and the stream 29 is divided into four streams by the splitter 37. Each of the streams is expanded through a valve V1, V2, V3, V4 and is vaporized in the exchanger 13. The lowest-pressure stream is compressed in the compressor 121, another is compressed in the compressor 221 and three of the streams are combined before being compressed in the compressor 21. The fourth stream is introduced into the compressor 21 at an intermediate level, and the entire stream is sent to the condenser 27.

Another gas rich in carbon dioxide 1 is sent to a compressor 3, cooled in the exchanger 13, partially condensed and then sent to the first phase separator 39. The liquid 43 from the first phase separator 39 is expanded and sent to the top of a distillation column 15. The gas for the first phase separator is cooled in the exchanger 13, then sent to the second phase separator 41. The liquid 45 formed is expanded and sent to the top of the column 15. The gas 43 is heated up in the exchanger 13, expanded through two turbines 45, 48 then leaves as a stream 49. The liquid 19 from the bottom of the column is cooled in the exchanger 13 to form a liquid product at 7 bar and −50° C. The cold for this liquefaction is therefore supplied by the refrigeration cycle.

The head gas 47 of the column 15 is heated and sent to an intermediate level of the compressor 3.

The condensation temperature of the gaseous stream rich in carbon dioxide 25 defines the pressure to which the stream rich in carbon dioxide needs to be compressed in a compressor. The lower this temperature, the less compression energy is required, and the more economical the compressor.

SUMMARY OF THE INVENTION

The simplest solution is to condense the stream rich in carbon dioxide against water taking care to use water that is as cold as possible. The water may, for example, come from a semi-open circuit cooled by an evaporative cooling tower. With a given minimum thermal approach in the exchanger in which the stream rich in carbon dioxide is condensed against the water, the less the water heats up, the lower will be the condensation temperature of the stream rich in carbon dioxide and, therefore, the pressure thereof in the case of condensation below the critical pressure (see FIGS. 4 and 5).

There is therefore a true benefit to be had in increasing the stream of water through the exchanger in which condensation takes place, because that will correspondingly lower the water outlet temperature and therefore the condensation temperature of the stream rich in carbon dioxide. However, it will increase the water network and the costs associated therewith: pumping energy, cost of equipment such as pumps, pipes, evaporative cooling towers, fans, etc. Indeed, the investment cost and some of the operating costs are proportional to the flow rate of the stream of water rather than (or only to a very limited extent) to the energy to be removed in the water network. Thus, in certain environments, it is preferable to increase the rise in temperature of the water in the compressor refrigerants beyond the 10° C. generally adopted. That is particularly true of projects in which refrigeration is achieved using non-evaporative cooling towers.

One subject of the invention is a method for condensing a gas stream rich in carbon dioxide, in which method a stream of water is heated up by exchange of heat with the stream rich in carbon dioxide which at least partially condenses, characterized in that the heated stream is sent to
  i) at least one compressor of the stream rich in carbon dioxide and/or
  ii) at least one compressor of a fluid from which the stream rich in carbon dioxide is derived
in order to at least partially cool at least one stage of this (these) compressor(s).

According to other optional aspects:

the stream of water heated while the compressor is being cooled, is cooled and returned at least in part in order to cool the stream rich in carbon dioxide that is to be condensed, the fluid compressed in the compressor is treated by distillation and/or by amine scrubbing and/or by permeation and/or by adsorption to form the stream rich in carbon dioxide, the water heated by condensation of carbon dioxide is at a first temperature and is sent to the compressor(s) at a temperature substantially equal to the first temperature, the water heated by condensation of carbon dioxide is divided into two portions, one portion being sent to a compressor of the stream rich in carbon dioxide which will then be condensed, and the other portion being sent to a compressor of a fluid from which the stream rich in carbon dioxide is derived.

Another subject of the invention is an installation for condensing a gaseous stream rich in carbon dioxide, comprising a condenser, a pipe for sending a gaseous stream rich in carbon dioxide to the condenser, a pipe for withdrawing an at least partially condensed stream rich in carbon dioxide from the condenser, a pipe for sending a stream of water to the condenser and a pipe for withdrawing a stream of heated water from the condenser, and at least one compressor of the gaseous stream rich in carbon dioxide or of a fluid from which the gaseous stream will be derived, characterized in that means of cooling this compressor are connected to the pipe for withdrawing the stream of heated water so that the cooling means receive at least some of the heated water stream.

According to other aspects of the invention, the installation comprises:

means for separating a fluid to form the stream rich in carbon dioxide, the fluid compressor being connected to these means and these means also being connected to the condenser, possibly via at least one other compressor, the means for separating a fluid consist of a separation device working by condensation and/or by distillation, an amine scrubbing device or a separation device working by permeation or by adsorption, a water circuit allowing water heated in the compressor(s) to be sent to a cooling means and from the cooling means to the condenser, a fluid compressor and a compressor of gaseous stream rich in carbon dioxide, the two compressors having cooling means connected in series with the condenser and in parallel between the two compressors, the condenser is connected in series with the compressor(s) by the pipe for withdrawing the stream of heated water.

The invention consists in positioning in series, on the water circuit, downstream of the condenser of the gas stream rich in carbon dioxide, at least one other consumer of process water for which the water temperature is not critical (FIG. 3). Thus, a few additional degrees of temperature in the water that refrigerates the compressors will not have any major impact on the performance of the unit.

However, it will be preferable to keep the water as cold as possible in the coolers upstream of the cold box and of any refrigeration units, which may themselves be positioned before the cold box or before a desiccation unit.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

The invention will be described in greater detail with reference to FIGS. 3 to 5.

Figure 1:
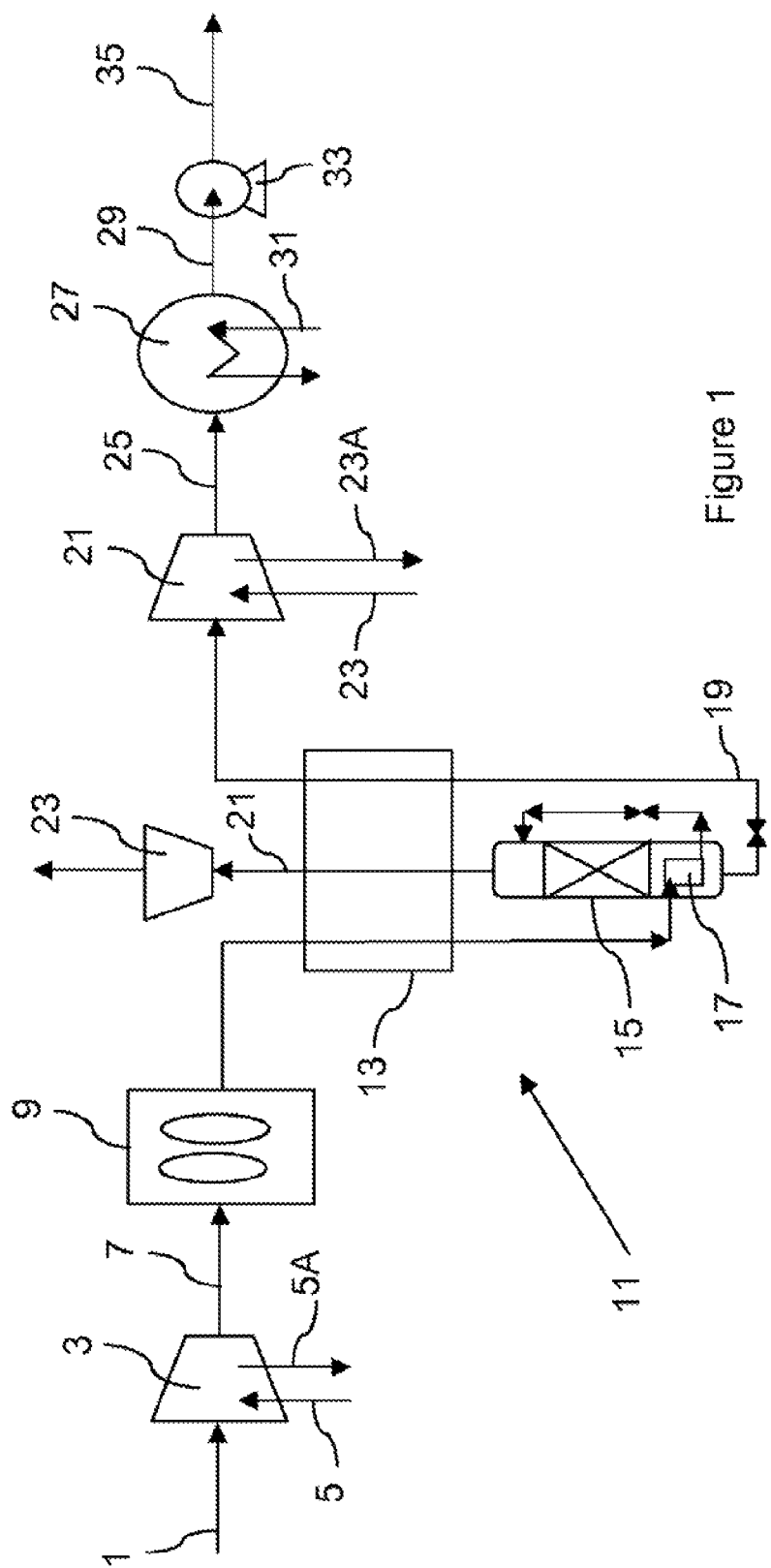
FIG. 1 shows an embodiment of the prior art.
Figure 3:
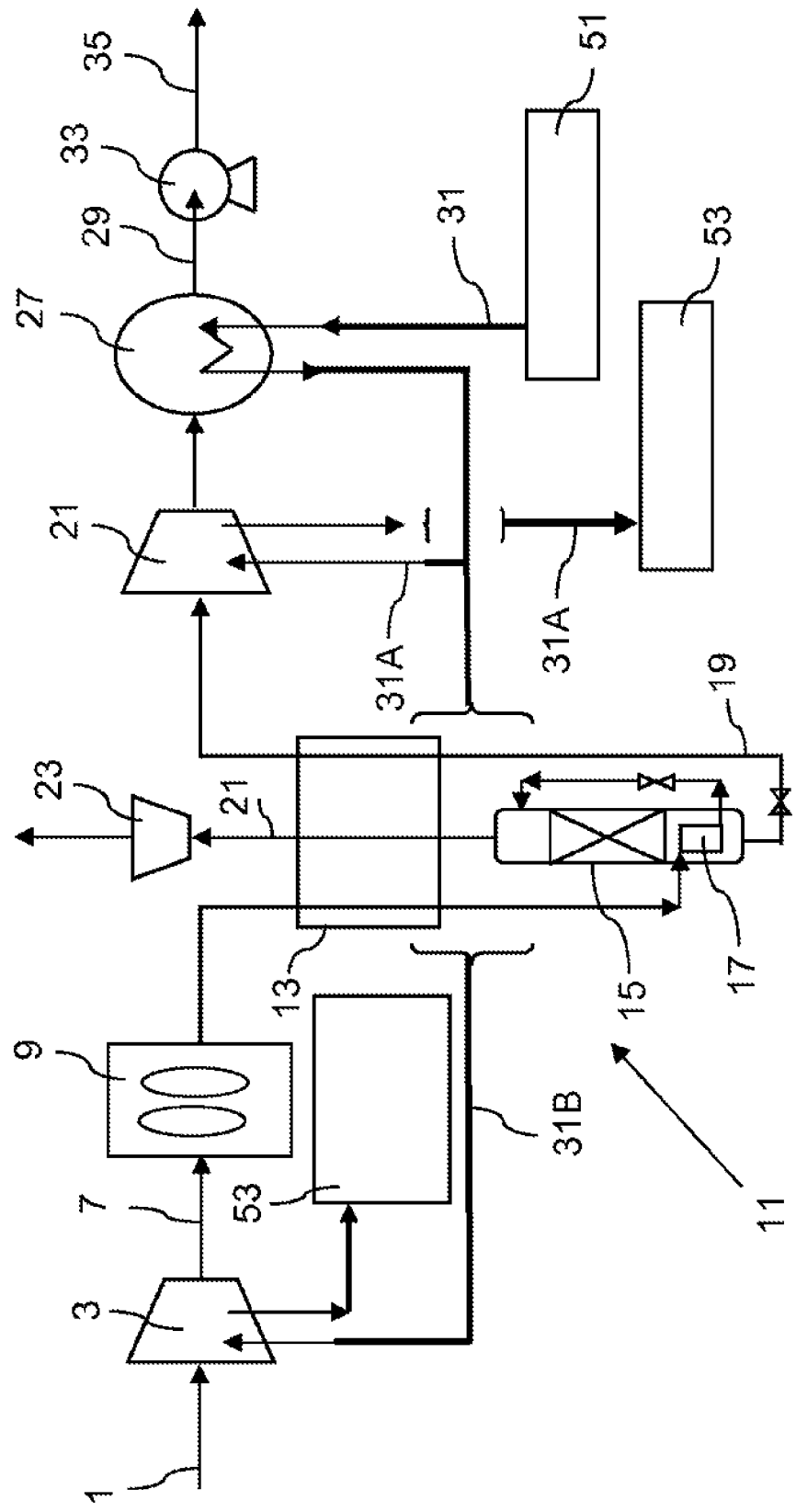
FIG. 3 shows an embodiment of the invention.

FIG. 3 differs from FIG. 1 in that the water used to cool the compressors 3 and 21 comes from the same cooling circuit as the water of the condenser 27 and has been used to condense the gas rich in carbon dioxide before being used to cool the compressors.

Thus, the water 31 is divided into two parts 31A, 31B. The part 31A is sent to the compressor 21 to cool it and the water thus heated is sent to a cooling means 53. The part 31B is sent to the compressor 3 of fluid intended for distillation and the water thus heated is also sent to the cooling means 53 which may be a cooling tower. The cooled water 51 from the cooling means 53 is once again sent to the condenser 31.

The separation means 11 may be a separation means working by cooling and condensation or by amine scrubbing or by permeation or by adsorption.

The fluid 1 is preferably a gas containing at least 50% carbon dioxide.

Thus, the water is sent to the two compressors in parallel. It would also be conceivable to send the water to just one of these two compressors. It would also be conceivable to send the water to other consumers on the site (compressors of air separation devices, coolers on the boiler or any other consumer).

A numerical example illustrates the advantages of the invention:

| Cooling water networks in parallel | | | | |
|---|---|---|---|---|
| | Thermal | Cooling water temperatures | | Water |
| | power kcal/h | Inlet ° C. | Outlet ° C. | flow rate m³/h |
| Water for condensation | 7.13E+06 | 25 | 28.84 | 1860 |
| Water for the rest of the plant | 3.33E+07 | 25 | 35 | 3340 |
| Specific energy (kWh/t CO2 condensed) | 132.2 | excluding energy from the water circuit | | |
| Specific energy (kWh/t CO2 condensed) | 136.4 | with water circuit (pumps and fans) (86% for pumps) | | |
| Total flow rate of water stream to be circulated | | | | 5200 |

| Cooling water networks in series | | | | |
|---|---|---|---|---|
| | Thermal power kcal/h | Cooling water temperatures | | Water flow rate m³/h |
| | | Inlet ° C. | Outlet ° C. | |
| Water for condensation | | 25 | 28.84 | 1860 |
| Water for the rest of the plant (of which 100% of the flow rate used for condensation) | | 28.15 | 38.15 | 3095 |
| Specific energy (kWh/t CO2 condensed) | 133.3 | excluding energy from the water circuit | | |
| Specific energy (kWh/t CO2 condensed) | 136 | with water circuit (pumps and fans) (78% for pumps) | | |
| Common cooling tower | 4.06E+07 | 38.15 | 25 | 3095 |
| Total flow rate of water stream to be circulated | | | | 3095 |

For the same condensed quantity of stream rich in carbon dioxide, the cooling water flow rate therefore drops from 5200 m³/h according to the prior art to 3095 m³/h for the invention. The specific energy of the compressors increases because the cooling water is hotter (from 132.2 to 133.3 kWh/t of $CO_2$ condensed), but if the energy needed to circulate the cooling water is taken into consideration, the total amount of energy needed on site will be reduced.

Another advantage of the invention is that it becomes economical to increase the flow rate of water through the condenser of the stream rich in carbon dioxide. Although doing so would not be economical with networks in parallel—because the drop in condensation temperature (and therefore in compression energy) had to fully compensate for the increase in flow rate and therefore in the cost of the associated equipment—it does become conceivable in networks in series where increasing the flow rate through the condenser has a number of positive outcomes:

reducing the condensation temperature;
reducing the temperature of the cooling water in the other equipment and therefore the compression energy for the rest of the plant.

By contrast, the condenser of the stream rich in carbon dioxide needs to be sized for a larger flow rate of water, but that is undoubtedly of secondary concern compared with the benefit of condensing at a lower temperature.

According to another aspect of the invention, it is the rest of the plant that adapts to suit the water flow rate chosen for the condenser. The heat rise therefore increases in the other coolers and the water network is smaller, with larger coolers because the thermal approaches (LMTDs) reduce as the water is heated up more against the gas which becomes cooled. In the example given hereinabove, the flow rate of water consumed on site would drop to 1860 m³/h rather than 3100 m³/h and the compression energy would increase a little more because of the water being hotter (28.84° C. in place of 28.15° C.).

Figure 4:
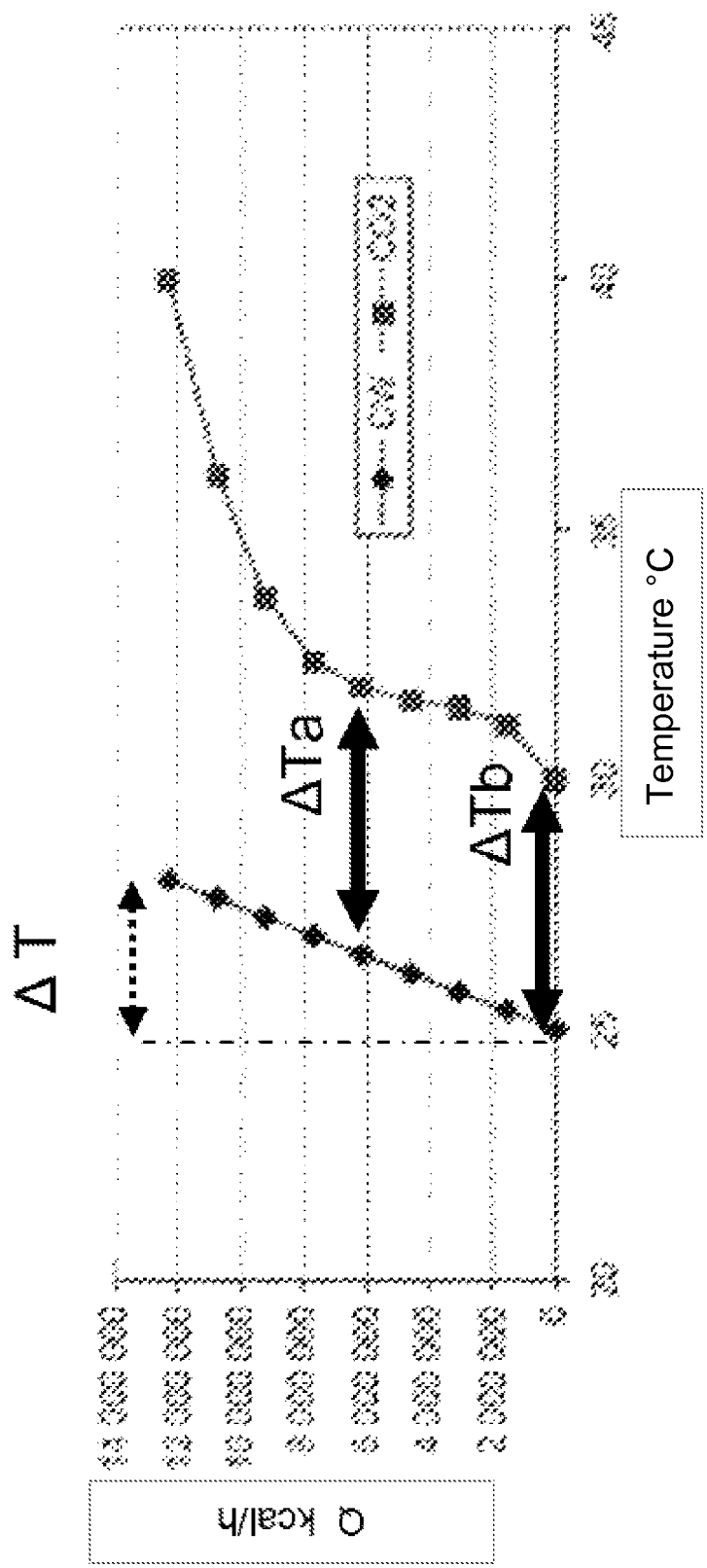
FIG. 4 shows an embodiment of the invention.

FIG. 4 shows a diagram for exchange of heat in the condenser of the stream rich in carbon dioxide when the gas condenses at around its critical pressure; thus the condensation level-off may be seen. The heat exchanged is shown on the ordinate axis and the temperature on the abscissa axis. ΔT indicates the rise in temperature of the water, ΔTa the approach temperature in the condensation exchanger at an intermediate point and ΔTb the approach temperature at the cold end.

Figure 5:
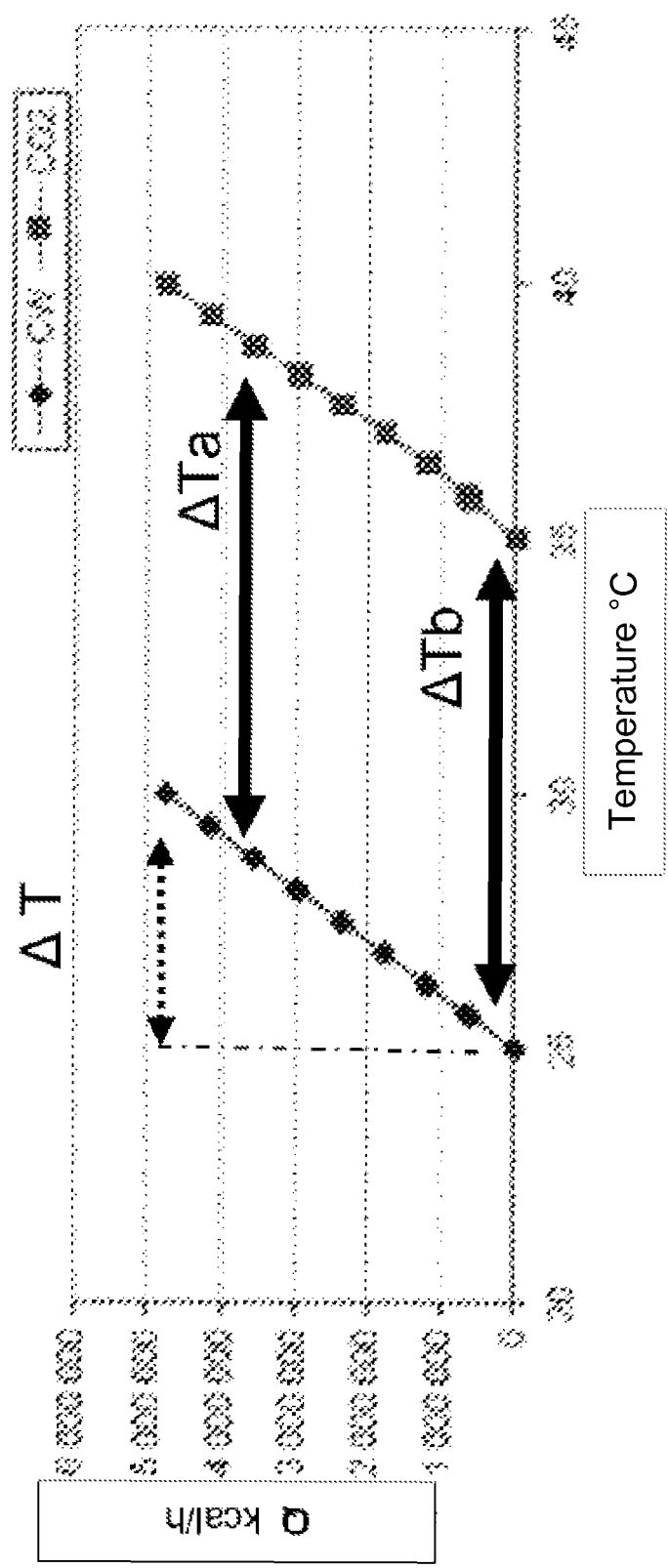
FIG. 5 shows an embodiment of the invention.

In contrast with FIG. 4, FIG. 5 shows the same diagram for supercritical condensation, which is why there is no level-off Pseudocondensation corresponds to a pronounced change in density.

Figure 2:
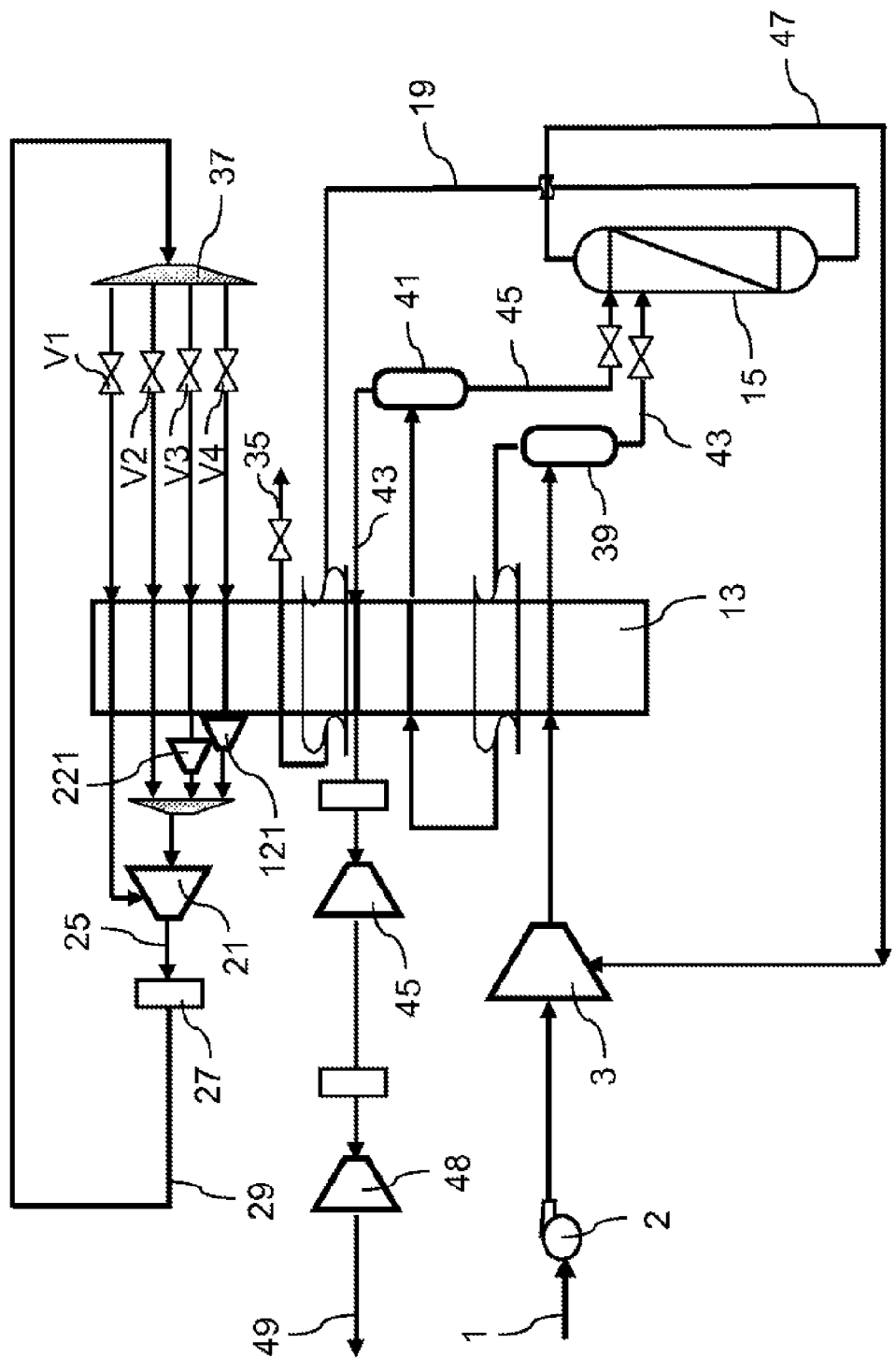
FIG. 2 shows an embodiment of the prior art.

It would also be possible to implement the invention with the diagram of FIG. 2. In that case, the water would be heated up in the condenser 27. This heated water would then be used to cool at least one of the compressors 3, 21, 121, 221 or any other cooling water consumer on the site.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

The invention claimed is:

1. A method for condensing a gas stream rich in carbon dioxide, in which method a stream of water is heated up by exchange of heat in a heat exchanger with the gas stream rich in carbon dioxide which at least partially condenses to produce a heated water stream and an at least partially condensed carbon dioxide rich stream, wherein the heated water stream is further heated by sending the heated water stream to:
   i) a first compressor of the gas stream rich in carbon dioxide in order to cool the first compressor of the gas stream rich in carbon dioxide; and
   ii) a second compressor of a fluid from which the stream rich in carbon dioxide is derived in order to at least partially cool at least one stage of the second compressor, thereby producing an extra heated water stream, wherein the heated water stream is sent to the first compressor and the second compressor in a parallel configuration.

2. The method as claimed in claim 1, further comprising the step of cooling the extra heated water stream to produce a cooled water stream, and recycling at least a portion of the cooled water stream to be used as the stream of water order to cool the stream rich in carbon dioxide that is to be at least partially condensed.

3. The method as claimed in claim 1, in which the fluid compressed in the second compressor is derived from a process to form the stream rich in carbon dioxide, wherein the process is selected from the group consisting of distillation, amine scrubbing, permeation, adsorption, and combinations thereof.

4. The method as claimed in claim 1, in which the heated water stream is at a first temperature and is sent to the first compressor and the second compressor at a temperature equal to the first temperature.

\* \* \* \* \*